United States Patent [19]

Shinozaki et al.

[11] Patent Number: 5,398,857
[45] Date of Patent: Mar. 21, 1995

[54] METHOD AND APPARATUS FOR CUTTING PLATE-SHAPED BRITTLE MATERIAL

[75] Inventors: Kengo Shinozaki, Tokyo; Kimihiro Wakabayashi, Kanagawa; Hiroki Murakami, Kanagawa; Masaaki Araki, Kanagawa, all of Japan

[73] Assignee: Fuji Xerox Co., Ltd., Tokyo, Japan

[21] Appl. No.: 84,069

[22] Filed: Jun. 30, 1993

[30] Foreign Application Priority Data

Jun. 30, 1992 [JP] Japan .................. 4-172813

[51] Int. Cl.$^6$ ............................................. C03B 33/03
[52] U.S. Cl. ..................................... 225/2; 225/96.5
[58] Field of Search .................. 225/1, 2, 96, 96.5

[56] References Cited

U.S. PATENT DOCUMENTS

| | | | |
|---|---|---|---|
| 2,584,851 | 2/1952 | Dunipace | 225/2 |
| 3,371,833 | 3/1968 | Sutton | 225/2 |
| 3,532,260 | 10/1970 | Augustin et al. | 225/2 |
| 3,559,855 | 2/1971 | Barnett et al. | 225/2 |
| 3,584,773 | 6/1971 | Grove et al. | 225/2 |
| 3,770,173 | 11/1973 | Carothers et al. | 225/2 |
| 4,175,684 | 11/1979 | Butler | 225/2 |
| 4,538,588 | 9/1985 | Nyman | 225/2 |
| 5,016,800 | 5/1991 | Sato et al. | 225/2 |

FOREIGN PATENT DOCUMENTS 62-46930 2/1987 Japan .

OTHER PUBLICATIONS

A collection of treatises edited by The Japan Mechanical Engineering Association, No. 513, vol. 55, Edition C, published on May, 1989.

Primary Examiner—Hien H. Phan
Attorney, Agent, or Firm—Finnegan, Henderson, Farabow, Garrett & Dunner

[57] ABSTRACT

To assure that a plate-shaped brittle material is exactly cut into two plate pieces, a jig having a thread-shaped projection secured thereto in conformity with a predetermined pattern positionally coincident with a cut groove formed in the plate-shaped brittle material, an elastic member located on the cut groove side of the plate-shaped brittle material, and a plate-shaped brittle material to be cut into two plate pieces are placed on a table of a press machine one above another, and subsequently, a predetermined intensity of pressing power is applied to the jig from above by operating a pressing machine. Alternatively, a jig having a thread-shaped projection secured thereto, an elastic member located on the opposite side relative to the cut groove side of the plate-shaped brittle material, and a plate-shaped brittle material to be cut into two plate pieces may be placed on the press table one above another. Otherwise, a pair of jigs each having a thread-shaped projection secured thereto, a pair of elastic members one of which is located on the cut groove side of a plate-shaped brittle material and other one of which is located on the opposite side relative to the cut groove side of the plate-shaped brittle material, and a plate-shaped brittle material to be cut into two plate pieces may be placed on the press table one above another.

9 Claims, 8 Drawing Sheets

FIG. 15(a)  FIG. 15(b)  FIG. 15(c)
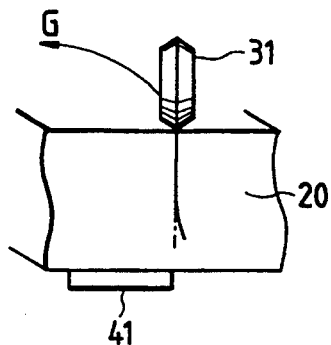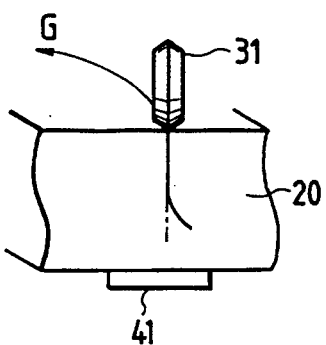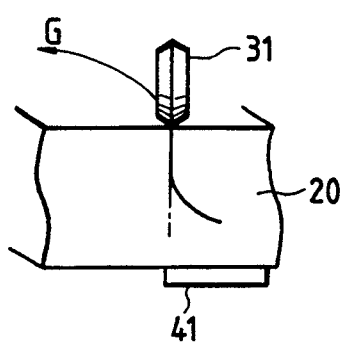
FIG. 16
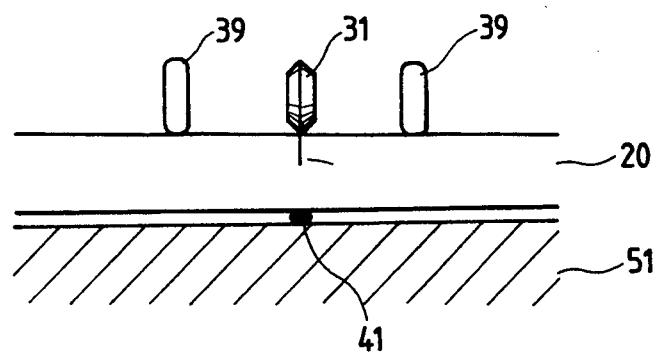
FIG. 17
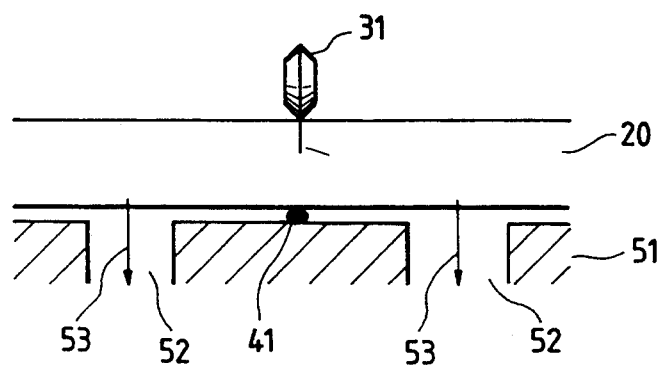

METHOD AND APPARATUS FOR CUTTING PLATE-SHAPED BRITTLE MATERIAL

BACKGROUND OF THE INVENTION

The present invention relates to a method and an apparatus for cutting a plate-shaped brittle material into two plate pieces. More particularly, the present invention relates to a method and an apparatus of the foregoing type preferably employable in case that a plurality of elements are formed on a plate-shaped brittle material having a small thickness to produce a semiconductor sensor, a solar cell, an integrated circuit tip, a liquid crystal display element or the like, and subsequently, the plate-shaped brittle material is cut into a plurality of element units each usable as a component. Further, the present invention relates to an apparatus for forming a cut groove in a plate-shaped brittle material in conformity with a predetermined cutting pattern using a rotary disc type scribing tip.

In general, a method of cutting a plate-shaped brittle material such as a glass plate or, the like in conformity with a predetermined pattern is classified into two methods, one of them being such that a cut groove exhibiting the foregoing predetermined pattern is formed in a plate-shaped brittle material by actuating a tool made of diamond, cemented tungsten carbide or the like and the other one being such that a part of the plate-shaped brittle material such as a glass plate or the like is cut therefrom by operating a machine tool such as a laser working machine, a slicer or the like.

With the first-mentioned method classified in that way, a certain intensity of moment is usually applied to a plate-shaped brittle material with a cut groove as a datum point so as to impart a tensile force to the plate-shaped brittle material, and it has been known that a cut surface having excellent appearance can be formed for a short time with a small magnitude of imparted power by employing the first-mentioned method. Incidentally, the foregoing fact is applicable only to case that a plate-shaped brittle material is cut in conformity with a linear pattern. However, in case that the plate-shaped brittle material is to be cut in conformity with a cutting pattern including bent parts, it is practically difficult to uniformly apply moment to the cut groove formed in the plate-shaped brittle material. Thus, in this case, there arises a problem that a cut edge slantwise extends, causing an unacceptable cut surface to be undesirably formed without any possibility that the plate-shaped brittle material can correctly be cut in conformity with a predetermined cut groove.

To solve the foregoing problem, a proposal has been made with respect to a cutting method for which friction is utilized (see NO. 513, Vol. 55, A collection of treatises edited by The Japan Mechanical Engineering Association (Edition C), published on May, 1989). According to this proposal, the cutting method is practiced in such a manner that the plate-shaped brittle material having a cut groove formed therein is clamped between a pair of pressing plates each having an elastic modulus smaller than that of the plate-shaped brittle material, and subsequently, an assemble of the plate-shaped brittle material and the pressing plates is compressed in the vertical direction by operating a press machine until the pressing plates are broken, causing the power effective in the outward orienting direction to be applied to the cut groove, whereby the plate-shaped brittle material can be cut in conformity with a predetermined pattern.

The foregoing proposed cutting method makes it possible to correctly cut a plate-shaped brittle material in conformity with any other pattern rather than a linear line, because no moment is applied to the plate-shaped brittle material. However, to assure that a high intensity of power enough to properly achieve each cutting operation is imparted to the cut groove formed in the plate-shaped brittle material by utilizing the power effective in the outward orienting direction applied to the pressing plates, a large magnitude of pressing power is required, resulting in the press machine being unavoidably designed and constructed with large dimensions.

In case that an item to be cut is a semiconductor sensor, a solar cell, an integrated circuit tip, a liquid crystal display element or the like, since there often arises an occasion that a complicated and fine circuit pattern, a deposited film or the like is formed on a plate-shaped brittle material, there is a high risk that the circuit pattern, the deposited film or the like are damaged or injured by the pressing power given by the press machine.

In addition, another method similar to the first-mentioned one wherein a laser light beam is irradiated to a cut groove formed in a plate-shaped brittle material in conformity with a predetermined pattern so that cracks formed in association with the cut groove progressively grow by the thermal stress induced by the irradiation of the laser light beam, causing the plate-shaped brittle material to be cut in conformity with the foregoing predetermined pattern is disclosed in an official gazette of Japanese Patent Laid-Open Publication NO. 62-46930.

With this method disclosed in that way, since no moment is applied to the plate-shaped brittle material, and moreover, no energy is given to the cut groove, the problem inherent to the first-mentioned method does not appear on the plate-shaped brittle material. However, since the thermal stress is utilized for the purpose of cutting the plate-shaped brittle material into plate pieces, there arises an occasion that the pattern of the cut groove is adversely affected by the heat generated by the irradiation of the laser light beam, and the cracks do not grow further in the predetermined direction due to the stress remaining in the plate-shaped brittle material and the presence of another fine cracks rather than the cut groove. Further, since the laser working machine is very expensive and the plate-shaped brittle material is practically cut at a low working speed, there arises a drawback that a cost required for achieving each cutting operation is undesirably raised up.

In addition, a method of cutting a plate-shaped brittle material into plate pieces by utilizing heat generated by irradiation of a laser light beam, a method of cutting the same by injecting a high pressure water stream to the plate-shaped brittle material and a method of cutting the same by recirculatively driving a wire saw can be noted as another methods modified from the last-mentioned method classified in the aforementioned manner. However, each of the foregoing methods has a drawback that each cutting operation is achieved at a low efficiency due to a slow working speed thereof.

Further, to form or scribe a cut groove in a plate-shaped brittle material, a method of using a scribing tip made of diamond, hard metal (cemented carbide) or the like for cutting the plate-shaped brittle material has been usually employed for satisfactorily accomplishing the foregoing purpose. In case that the cut groove is formed in the shape of a curved line, an imbalanced stress is applied to the plate-shaped brittle plate during each scribing operation, causing the scribing crack formed in association with the cut groove to be bent at a substantially right angle relative to the direction of a depth of the cut groove (see FIG. 10(*a*)). When the plate-shaped brittle plate is cut into two plate pieces while the foregoing state is maintained, the cut edge is slantwise warped. Thus, there arises a problem that the cut surface exhibits unacceptable appearance because so-called burrs are formed along the cut edge (see FIG. 10(*b*)).

SUMMARY OF THE INVENTION

The present invention has been made in consideration of the aforementioned background.

An object of the present invention is to provide a method of cutting a plate-shaped brittle material into two plate pieces wherein the plate-shaped brittle material can exactly be cut at a high yielding rate regardless of the geometrical configuration of the plate-shaped brittle material.

Another object of the present invention is to provide an apparatus for cutting a plate-shaped brittle material into two plate pieces wherein the plate-shaped brittle material can exactly be cut at a high yielding rate regardless of the geometrical configuration of the plate-shaped brittle material.

Further object of the present invention is to provide an apparatus for forming a cut groove in a plate-shaped brittle material wherein the cut groove can linearly be formed in the plate-shaped brittle material with a large depth.

According to a first aspect of the present invention, there is provided a method of forming a plate-shaped brittle material into two plate pieces, wherein the method comprises a step of forming a cut groove in the plate-shaped brittle material in conformity with a predetermined pattern extending on the plate-shaped brittle material in the longitudinal direction of the latter; a step of superimposing a jig having a thread-shaped projection secured thereto on the plate-shaped brittle material on the cut groove side of the latter with an elastic member interposed between the plate-shaped brittle material and the jig while a ridge line of the thread-shaped projection extends in conformity with the predetermined pattern of the cut groove with a constant height as measured from the surface of the plate-shaped brittle material; and a step of applying a predetermined intensity of compressing force to the plate-shaped brittle material at a right angle relative to the surface side of the plate-shaped brittle material having the cut groove formed therein via the jig and the elastic member to compress the jig with the thus applied compressing force; whereby two plate pieces each cut from the plate-shaped brittle material in conformity with the predetermined pattern are obtained by operating an apparatus for cutting a plate-shaped brittle material into two plate pieces.

According to a second aspect of the present invention, there is provided a method of cutting a plate-shaped brittle material into two plate pieces, wherein the method comprises a step of forming a cut groove in the plate-shaped brittle material in conformity with a predetermined patter extending on the plate-shaped brittle material in the longitudinal direction of the latter; a step of superimposing a jig having a thread-shaped projection secured thereto on the plate-shaped brittle material on the opposite side relative to the cut groove side of the plate-shape brittle material with an elastic member interposed between the plate-shaped brittle material and the jig while a ridge line of the thread-shaped projection extends in conformity with the predetermined pattern of the cut groove with a constant height as measured from the surface of the plate-shaped brittle material; and a step of applying a predetermined intensity of compressing force to the plate-shaped brittle material at a right angle relative to the cut groove side of the plate-shaped brittle material via the jig and the elastic member to compress the plate-shaped brittle material with the thus applied compressing force; whereby two plate pieces each cut out from the plate-shaped brittle material in conformity with the predetermined pattern are obtained by operating an apparatus for cutting a plate-shaped brittle material into two plate pieces.

To assure that the plate-shaped brittle material is more reliably cut into two plate pieces, it is desirable that the method further includes a step of superimposing another jig having a thread-shaped projection secured thereto on the plate-shaped brittle material on the opposite side relative to the cut groove side of the plate-shaped brittle material with an elastic member interposed between the plate-shaped brittle material and the jig while a ridge line of the thread-shaped projection extends in conformity with the predetermined pattern of the cut groove with a constant height as measured from the surface of the plate-shaped brittle material, wherein the additional superimposing step is executed prior to the compressing power applying step.

According to a third aspect of the present invention, there is provided a method of cutting a plate-shaped brittle material into two pieces, wherein the method comprises a step of forming a cut groove in the plate-shaped brittle material in conformity with a predetermined pattern extending on the plate-shaped brittle material in the longitudinal direction of the latter; a step of superimposing a pair of jigs each having a thread-shaped projection secured thereto on the plate-shaped brittle material on the cut groove side of the latter as well as on the opposite side relative to the cut groove side with elastic members interposed between the plate-shaped brittle material and the jigs while a ridge line of each of the thread-shaped projections extends in conformity with the predetermined pattern of the cut groove with a constant height as measured from the surface of the plate-shaped brittle material; and a step of applying a predetermined intensity of compressing power to the plate-shaped brittle material at a right angle relative to the cut groove side of the plate-shaped brittle material via the upper jig and the upper elastic member to compress the plate-shaped brittle material with the thus applied compressing power; whereby two plate pieces each cut from the plate-shaped brittle material in conformity with the predetermined pattern are obtained by operating an apparatus for cutting a plate-shaped brittle material into two plate pieces.

Usually, the plate-shaped projection secured to the jig is formed by allowing the thread-shaped projection to continuously extend in conformity with the predetermined pattern positionally coincident with the cut groove.

Alternatively, the thread-shaped projection secured to the jig may be formed by allowing the thread-shaped projection to intermittently extend in conformity with the predetermined pattern positionally coincident with the cut groove.

Basically, an elastic modulus of the elastic member is set to be smaller than that of the plate-shaped brittle material to be cut into two plate pieces.

According to a fourth aspect of the present invention, there is provided an apparatus for cutting a plate-shaped brittle material into two plate pieces, wherein the apparatus comprises a jig having a thread-shaped projection secured thereto with a constant height as measured from the surface of the plate-shaped brittle material, the thread-shaped projection extending in conformity with a predetermined pattern positionally coincident with a cut groove formed in the plate-shaped brittle material; an elastic member interposed between the jig and the plate-shaped brittle material on the cut groove side of the latter; an elastic member interposed between the jig and the plate-shaped brittle material on the cut groove side of the latter; and a pressing member for applying a predetermined intensity of compressing power to the plate-shaped brittle material at a right angle relative to the surface of the plate-shaped brittle material; whereby two plate pieces each cut from the plate-shaped brittle material in conformity with the predetermined pattern are obtained by applying the compressing power to the plate-shaped brittle material via the jig and the elastic member.

According to a fifth aspect of the present invention, there is provided an apparatus for cutting a plate-shaped brittle material into two pieces, wherein the apparatus comprises a jig having a thread-shaped projection secured thereto with a constant height as measured from the surface of the plate-shaped brittle material, the thread-shaped projection extending in conformity with a predetermined pattern positionally coincident with a cut groove formed in the plate-shaped brittle material; an elastic member interposed between the jig and the plate-shaped brittle material on the opposite side relative to the cut groove side of the plate-shaped brittle material; and a pressing member for applying a predetermined intensity of compressing power to the plate-shaped brittle material at a right angle relative to the surface of the plate-shaped brittle material; whereby two plate pieces each cut from the plate-shaped brittle material in conformity with the predetermined pattern are obtained by applying the compressing power to the plate-shaped brittle material via the jig and the elastic member.

To assure that the plate-shaped brittle material is more reliably cut into two plate pieces, it is desirable that the apparatus further includes a second elastic member and a second jig having a thread-shaped projection secured thereto with a constant height as measured from the surface of the plate-shaped brittle material, wherein the second elastic member and the second jig are arranged on the opposite side relative to the cut groove side of the plate-shaped brittle material, and the thread-shaped projection extends in conformity with the predetermined pattern positionally coincident with the cut groove formed in the plate-shaped brittle material.

According to a sixth aspect of the present invention, there is provided an apparatus for cutting a plate-shaped brittle material into two plate pieces, wherein the apparatus comprises a pair of jigs each having a thread-shaped projection secured thereto with a constant height as measured from the surface of the plate-shaped brittle material, the thread-shaped projection extending in conformity with a predetermined pattern positionally coincident with a cut groove formed in the plate-shaped brittle material; a pair of elastic members interposed between the pair of jigs and the plate-shaped brittle material, one of the elastic members being located between the plate-shaped brittle material and one of the pair of jigs on the cut groove side of the plate-shaped brittle material, while the other one of the elastic materials being located between the plate-shaped brittle material and the other one of the pair of jigs on the opposite side relative to the cut groove side of the plate-shaped brittle material.

Usually, the thread-shaped projection secured to the jig is formed by allowing the thread-shaped projection to continuously extend in conformity with the predetermined pattern positionally coincident with the cut groove.

Alternatively, the thread-shaped projection secured to the jig may be formed by allowing the thread-shaped projection to intermittently extend in conformity with the predetermined pattern positionally coincident with the cut groove.

Basically, an elastic modulus of the elastic member is set to be smaller than that of the plate-shaped brittle material to be cut into two plate pieces.

In addition, according to a seventh aspect of the present invention, there is provided an apparatus for forming a cut groove in a plate-shaped brittle material to be cut into two plate pieces in conformity with a predetermined pattern, wherein the apparatus comprises a rotary disc type scribing tip adapted to be brought in contact with the surface of the plate-shaped brittle material; a holder for rotatably holding the rotary disc type scribing tip so as to be rotated about a first shaft; holder displacing means for displacing the holder in a predetermined direction while holding the holder so as to allow the holder to be turned about a second shaft; and holder controlling means for controlling the displacement of the holder; wherein the first shaft and the second shaft are arranged such that their center axes do not intersect each other, and moreover, the holder controlling means controls the holder displacing means in such a manner as to allow the rotary disc type scribing tip to be displaced in conformity with the predetermined pattern in order to form the cut groove in the plate-shaped brittle material.

To assure that the cut groove is more reliably formed in the plate-shaped brittle material, it is desirable that the apparatus further includes a table for holding the plate-shaped brittle material thereon and a projection member interposed between the table and the plate-shaped brittle material so as to allow the plate-shaped brittle material to be pressed by a pair of press rollers in cooperation with the projection member in order to form the cut groove in the plate-shaped brittle material in conformity with the predetermined patter.

Usually, the predetermined pattern for defining the cut groove includes bent parts on the opposite end sides of the plate-shaped brittle material. In this case, a part of the projection member corresponding to each of the curved parts is placed on the table at the position offset from a linear part of the predetermined pattern so as to form a part of the cut groove in the plate-shaped brittle material corresponding to each of the curved parts.

To apply a certain intensity of moment to the plate-shaped brittle material to positively form the cut groove in the plate-shaped brittle material, it is recommendable that a plurality of evacuating holes are formed through the table so as to bend the opposite sides of the plate-shaped brittle material in the downward direction under the influence of the reduced pressure.

Usually, the holder displacement controlling means is prepared in the form of a numerical controlling unit.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which:

FIG. 15(a) to FIG. 15(c) show by way of fragmentary perspective view that a projection member is placed on a table of a press machine;

FIG. 16 is a schematic sectional view of the cut groove forming apparatus, particularly showing that a pair of press rollers are arranged on a glass plate on the opposite sides of a rotary type scribing tip while a projection member is placed on the press table directly below the scribing tip; and FIG. 17 is a schematic sectional view of the cut groove forming apparatus, particularly showing that a plurality of evacuating holes are formed through the press table while a projection member is likewise placed on the press table directly below the scribing tip.

DESCRIPTION OF THE PREFERRED EMBODIMENTS

The present invention will now be described in detail hereinafter with reference to the accompanying drawings which illustrate several preferred embodiments thereof.

Figure 1:
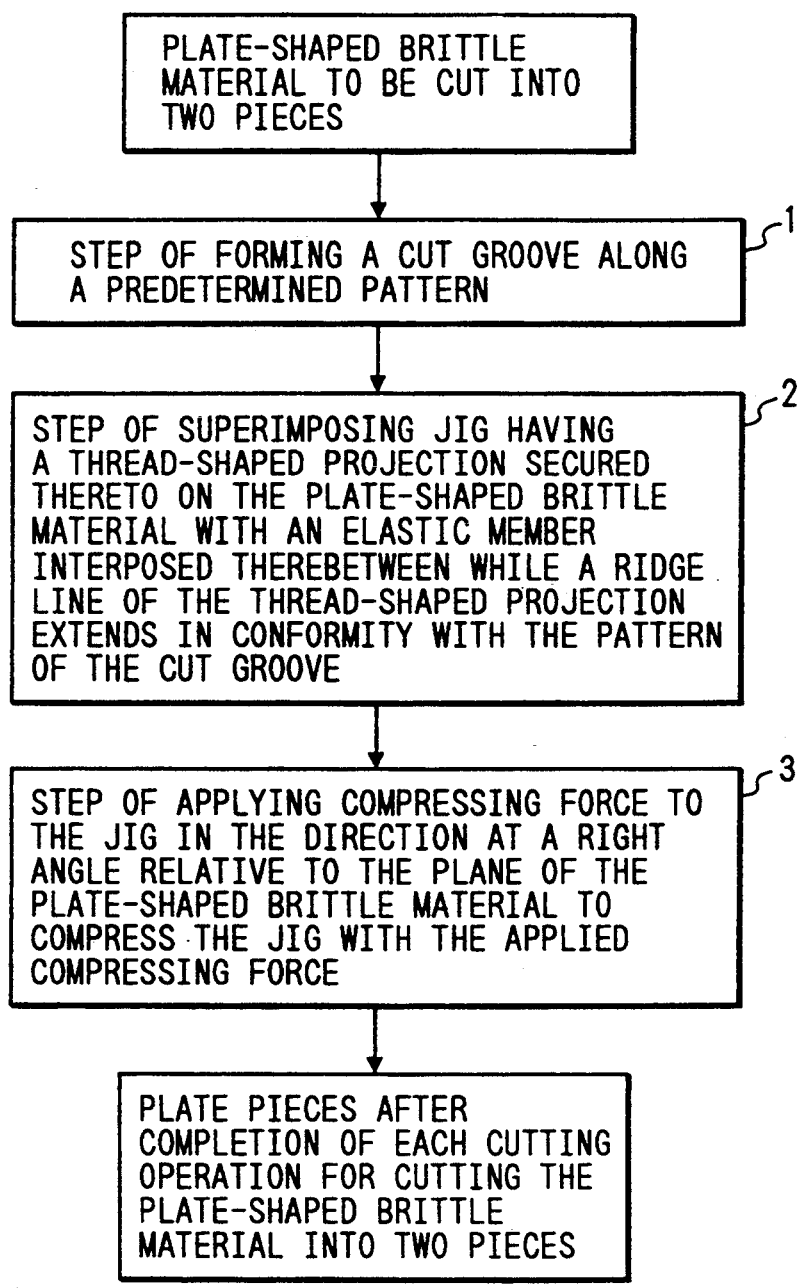
FIG. 1 is a flowchart which illustrates a series of steps to be executed by employing a method of cutting a plate-shaped brittle material into two plate pieces according to a first embodiment of the present invention.

FIG. 1 is a flowchart which illustrates a series of steps to be executed by employing a method of cutting a plate-shaped brittle material into two,plate pieces according to a first embodiment of the present invention.

The program starts from Step 1 in which a plate-shaped brittle material to be cut into two plate pieces is subjected to cutting/grooving in conformity with a predetermined pattern defined on the plate-shaped brittle material to form a cut groove in the plate-shaped brittle material by actuating a suitable tool made of diamond, hard metal (cemented carbide) or similar material.—cutting/grooving step (1)

On completion of Step 1, the program goes to Step 2 in which a jig having a thread-shaped projection secured thereto is superimposed on the plate-shaped brittle material having the cut groove formed therein with an elastic member interposed between the jig and the plate-shaped brittle material in such a manner that a ridge line on the thread-shaped projection is positionally coincident with the cut groove.—jig superimposing step (2)

Completion of Step 2, the program goes to Step 3 in which a high intensity of pressing power is applied to the jig superimposed on the plate-shaped brittle material in the direction at a right angle relative to the surface of the plate-shaped brittle material.—pressing step (3)

On completion of Step 3, the plate-shaped brittle material is cut into two plate pieces in conformity with the predetermined pattern defining the cut groove, and each of the two plate pieces exhibits a desired contour.

To execute Step 2, i.e., the jig superimposing step (2), one of the following processes can selectively be employed.

(a) A process of superimposing a jig having a thread-shaped projection secured thereto,on the plate-shaped brittle material on the cut groove side of the latter.

(b) A process of superimposing a jig having a thread-shaped projection secured thereto on the plate-shaped brittle material on the opposite side relative to the cut groove side of the plate-shaped material.

(c) A process of superimposing a pair of jigs each having a thread-shaped projection thereto on the plate-shaped brittle material wherein one of the jigs is located on the cut groove side of the plate-shaped brittle material and the other one of the jigs is located on the opposite side relative to the cut groove side of the plate-shaped brittle material.

In Step 3, i.e., the pressing step (3), the elastic member interposed between the jig and the plate-shaped brittle material is pressed by the ridge line of the thread-shaped projection, causing the elastic member to be elongated by the pressing power in the outward orienting direction with the cut groove as a center. As the elastic member is elongated in that way, a tensile power is applied to the plate-shaped brittle material which in turn is stretched in the opposite directions with the cut groove as a center in the presence of friction between the elastic member and the plate-shaped brittle material.

On completion of the pressing step (3), the plate-shaped brittle material is cut into two plate pieces along the cut groove under the influence of the tensile power.

Specifically, the pressing power applied to the elastic member by the jig via the ridge line of the thread-shaped projection is converted into a tensile power which in turn acts to stretch the opposite sides of the plate-shaped brittle material in the opposite directions relative to the cut groove. In addition, the tensile power transmitted to the plate-shaped brittle material in the presence of friction between the elastic member and the plate-shaped brittle material is uniformly applied to the opposite sides of the plate-shaped brittle material. Consequently, the cut surface formed along the cut groove linearly extends at a right angle relative to the surface of the plate-shaped brittle material.

Next, an apparatus for cutting a plate-shaped brittle material into two plate pieces according to the present invention will be described below with reference to FIG. 2 to FIG. 17.

Figure 2:
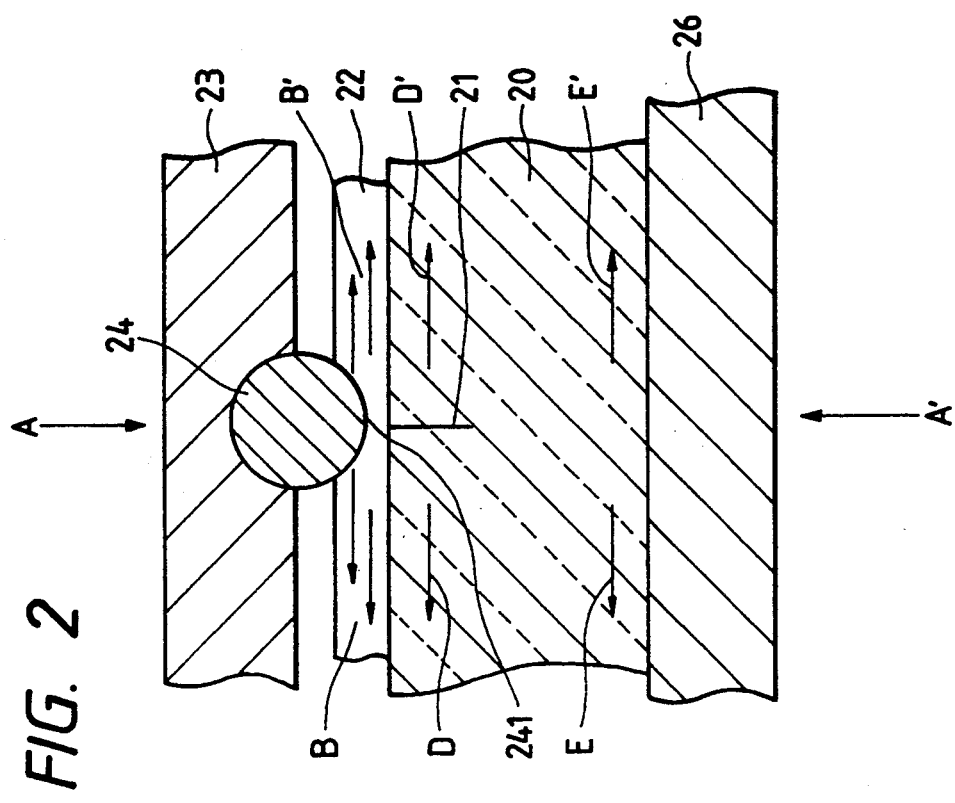
FIG. 2 is a fragmentary sectional view of an apparatus for cutting a plate-shaped brittle material into two plate pieces according to a second embodiment of the present invention, particularly showing essential components constituting the apparatus on an enlarged scale.

FIG. 2 is a sectional view of an apparatus for cutting a plate-shaped brittle material into two pieces according to a second embodiment of the present invention, particularly showing essential components constituting the apparatus. In FIG. 2, reference numeral 20 designates a glass plate to be cut into two plate pieces by operating the cutting apparatus, reference numeral 21 designates a cut groove, reference numeral 22 designates a sheet of polyurethane resin serving as an elastic member, reference numeral 23 designates a jig, reference numeral 24 designates a thread-shaped projection, reference numeral 241 designates a ridge line on the thread-shaped projection 24, and reference numeral 26 designates a table of a press machine (not shown).

In this embodiment, the thread-shaped projection 24 is placed directly above the cut groove 21 which is formed on the upper surface of the glass plate 20 in conformity with a predetermined pattern, and the elastic member 22 is interposed between the jig 23 having the thread-shaped projection 24 secured thereto and the glass plate 20. It is important that the ridge line 241 extending along the thread-shaped projection 24 is exactly positionally aligned with the cut groove 21 as seen in the vertical direction.

While the elastic member 22 is placed on the glass plate 20 and an assembly of the glass plate 20, the elastic member 22 and the jig 23 is then placed on the table 26, a high intensity of pressing power is imparted to the foregoing assembly in the direction represented by arrow marks A and A'.

As the foregoing assembly is pressed in the direction represented by the arrow marks A and A', the thread-shaped projection 24 presses the elastic member 22 in the vertical direction, causing tensile stresses B and B' effective in the horizontal direction to arise in the elastic member 22 under influence of the pressing power given by the press machine. Thus, the elastic member 22 is elongated in the horizontal direction in the presence of the tensile stresses B and B', whereby tensile powers each effective in the opposite direction relative to the cut groove 21 are induced in the elastic member 22 by the tensile stresses B and B'.

In addition, because of the presence of certain friction between the elastic member 22 and the glass plate 20, the tensile stresses B and B' generate tensile powers D and D' each effective in the opposite direction relative to the cut groove 21.

As the tensile powers D and D' are generated in such a manner as to cut the glass plate 20 into two plate pieces therewith, the cut groove 21 is progressively grown to reach the table 26, whereby the glass plate 20 is cut into two pieces by the tensile powers D and D' as if it is torn. On completion of the pressing operation, each of the cut plate pieces of the glass plate 20 exhibits a contour exactly corresponding to the predetermined pattern defining the cut groove 21.

As is apparent from the above description, according to the second embodiment of the present invention, any circuit and any film formed and deposited on the upper surface of the glass plate 20 are not damaged or injured at all during the cutting operation owing to the elastic member 22 interposed between the jig 23 and the glass plate 20. Since the cutting apparatus is simple in structure, each cutting operation can be achieved at an inexpensive cost.

Next, an apparatus for cutting a plate-shaped brittle material into two plate pieces according to a third embodiment of the present invention will be described below with reference to FIG. 3.

Figure 3:
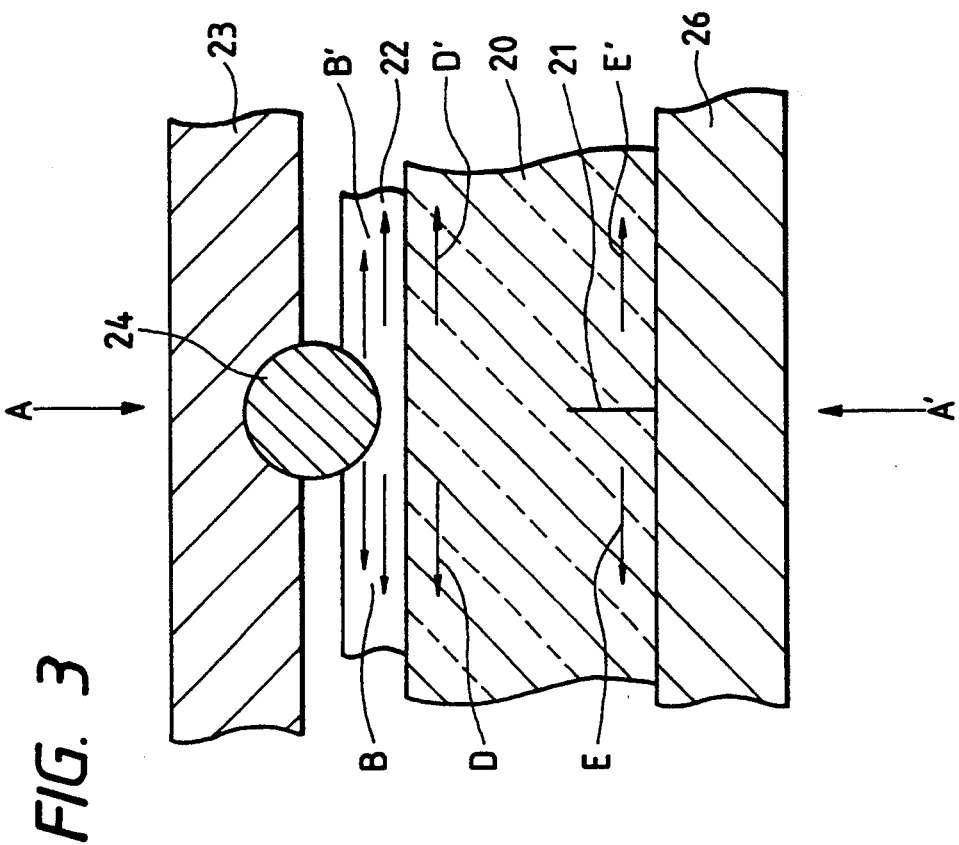
FIG. 3 is a fragmentary sectional view of an apparatus for cutting a plate-shaped brittle material into two plate pieces according to a third embodiment of the present invention, particularly showing essential components constituting the apparatus on an enlarged scale.

FIG. 3 is a sectional view of the apparatus, particularly showing essential components constituting the apparatus. It should be noted that same components as those in the preceding embodiment shown in FIG. 2 are represented by same reference numerals.

In contrast with the cutting apparatus constructed according to the second embodiment of the present invention wherein the cut groove 21 formed in the glass plate 20 faces to the jig 23 having the thread-shaped projection 24 secured thereto and an assembly of the glass 20, the elastic member 22, the jig 23 and the thread-shaped projection 24 is superimposed on the table 26, a cut groove 21 formed in a glass plate 20 faces to a table 26 of a press machine (not shown).

Also in this embodiment, the cut groove 21 is progressively grown by tensile powers D and D' each effective in the opposite direction for cutting the glass plate 20 into two plate pieces as if the glass plate is torn. Thus, on completion of a pressing operation, each of two cut plate pieces of the glass plate 20 exhibits a contour exactly corresponding to a predetermined pattern defining the cut groove 21.

Similarly, according to the third embodiment of the present invention, any circuit and any film formed and deposited on the upper surface of the glass plate 20 are not damaged or injured at all during each cutting operation owing to the elastic member 22 interposed between the jig 23 and the glass plate 20. Since the cutting apparatus is simple in structure, each cutting operation can be achieved at an inexpensive cost.

Next, an apparatus for cutting a plate-shaped brittle material into two plate pieces according to a fourth embodiment of the present invention will be described below with reference to FIG. 4.

Figure 4:
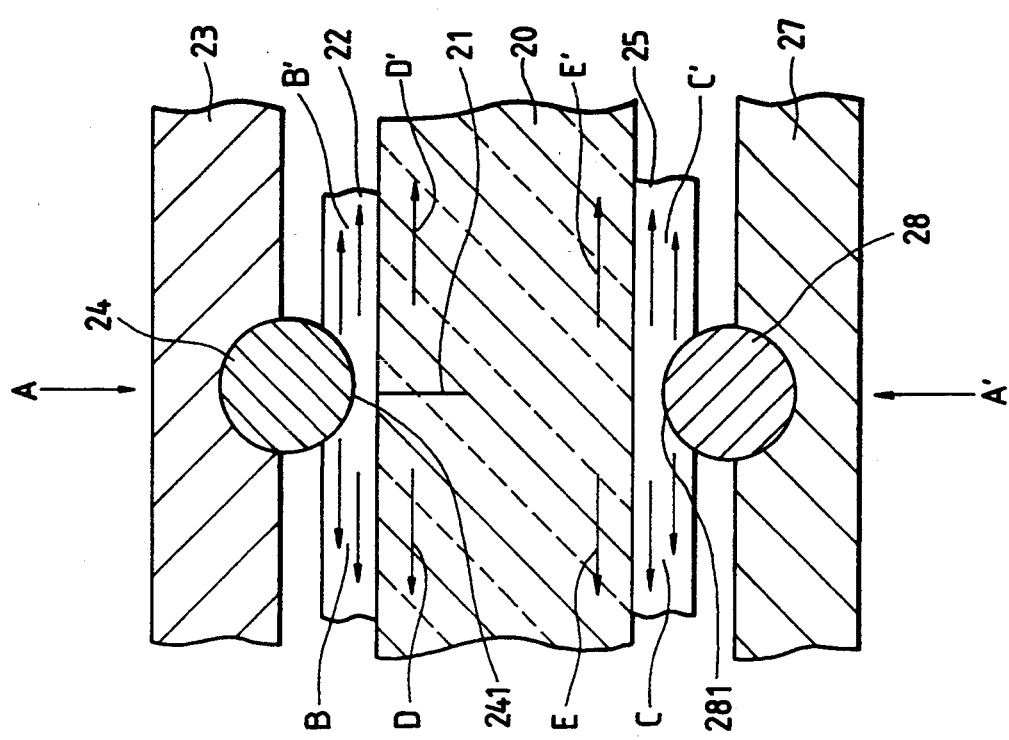
FIG. 4 is a fragmentary sectional view of an apparatus for cutting a plate-shaped brittle material into two plate pieces according to a fourth embodiment of the present invention, particularly showing essential components constituting the apparatus on an enlarged scale.

FIG. 4 is a sectional view of the apparatus, particularly shows essential components constituting the apparatus. It should be noted that same components as those in the second embodiment shown in FIG. 2 are represented by same reference numerals. In FIG. 4, reference numeral 27 designates a jig having a thread-shaped projection 28 secured thereto. As is apparent from the drawing, the jig 28 is designed with a similar structure to a jig 23 having a thread-shaped projection 24 secured thereto. In addition, reference numeral 281 designates a ridge line extending along the thread-shaped projection 28.

In contrast with the cutting apparatus described above with reference to FIG. 2 and FIG. 3 wherein the jig 23 and the elastic member 22 are superimposed on the glass 20 having the cut groove 21 formed on the upper surface side or the lower surface side of the glass plate 20, a jig 23 faces to the upper surface side of a glass plate 20 having a cut groove 21 formed therein while an elastic member 22 is interposed between the jig 23 and the glass plate 20, and moreover, a jig 27 faces to the lower surface side of the glass plate 20 having no cut groove formed therein while an elastic member 25 is interposed between the jig 27 and the glass plate 20.

In this embodiment, since upper and lower thread-shaped projections 24 and 28 are arranged on both the upper and lower surface sides of the glass plate 20 having the cut groove 21 formed on the upper surface side of the same, a certain intensity of cutting power can concentratively be increased especially on the lower surface side of the glass plate 20 having no cut groove formed therein. With this construction, each cutting operation can more exactly be achieved for a shorter time with a smaller magnitude of pressing power.

Figure 5:
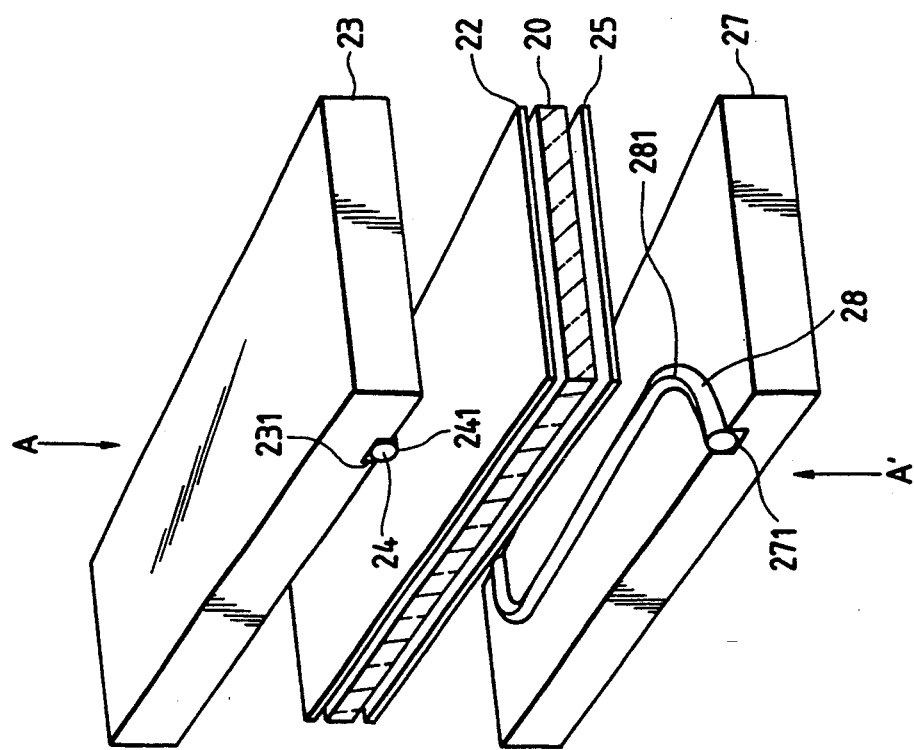
FIG. 5 is a perspective view of the cutting apparatus shown in FIG. 4, particularly showing the essential components constituting the apparatus.

FIG. 5 is a perspective view of the cutting apparatus shown in FIG. 4, particularly illustrating essential components constituting the cutting apparatus in the disassembled state. Same components as those shown in FIG. 4 are represented by same reference numerals.

The thread-shaped projection 24 is fitted into a groove 231 formed on the lower surface of the jig 23 with the same pattern as that of a cut groove (not shown) formed in the glass plate 20, while the thread-shaped projection 28 is fitted into a groove 271 formed on the upper surface of the jig 27 with the same pattern as that of the cut groove formed in the glass plate 20. A ridge line 241 extends along the thread-shaped projection 24 with a constant height as measured from the lower surface of the jig 23, while a ridge line 281 extends along the thread-shaped projection 28 with a constant height as measured from the upper surface of the jig 27.

Next, a cutting operation to be performed by operating the cutting apparatus constructed according to the present invention will be exemplified below with reference to FIG. 6 and FIG. 7.

Figure 6:
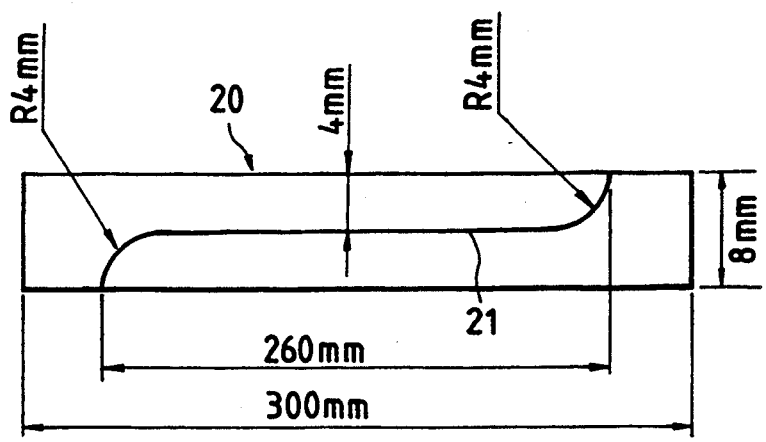
FIG. 6 shows by way of example a glass plate to be cut into two plate pieces by employing a cut groove forming method and a rotary disc type scriber.

FIG. 6 is a plan view of a glass plate which shows by way of example the case that a glass plate is cut into glass pieces. In the drawing, reference numeral 20 designates a borosilicate glass plate and reference numeral 21 designates a cut groove which is formed in the glass plate 20. The glass plate 20 is dimensioned to have a length of 300 mm, a width of 8 mm and a thickness of 1.1 mm. On the other hand, the cut groove 21 is formed with such a pattern that the glass plate 20 is divided into two glass plate pieces along the central part of the glass plate 20 as seen in the longitudinal direction with curved parts each having a radius of curvature of 4 mm curved on the opposite ends thereof in the opposite direction.

As described above with reference to FIG. 4 and FIG. 5, the elastic member 22 is superimposed on the upper surface of the glass plate 20 having the cut groove 21 formed therein, while the elastic member 25 is superimposed on the lower surface of the glass plate 20. In addition, the thread-shaped projection 24 having the same pattern as that of the cut groove 21 is superimposed on the upper surface of the elastic member 22, while the thread-shaped projection 28 having the same pattern as that of the cut groove 21 is superimposed on the lower surface of the elastic member 25.

It is important that the ridge line 241 extending along the thread-shaped projection 24 and a ridge line extending along the thread-shaped projection 28 are exactly positionally aligned with the cut groove 21 in the vertical direction. As the press machine (not shown) is operated, both the jigs 23 and 27 are increasingly pressed to approach each other until the glass plate 20 is cut into two glass plate pieces along the cut groove 21.

Figure 7A:
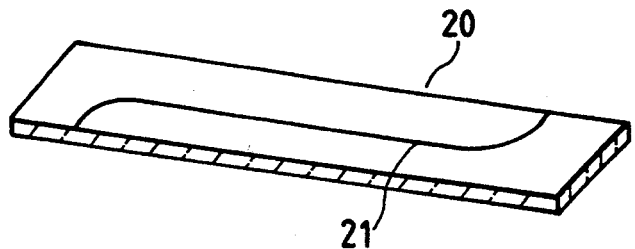
FIG. 7(a) is a perspective view of the glass plate shown in FIG. 6.
Figure 7B:
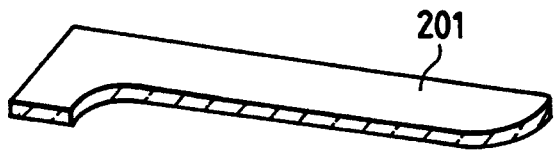
FIGS. 7(b) and 7(c) particularly illustrate the glass plate of FIGS. 6 and 7(a) in the disassembled state and that the glass plate is cut into two plate pieces.
Figure 7C:
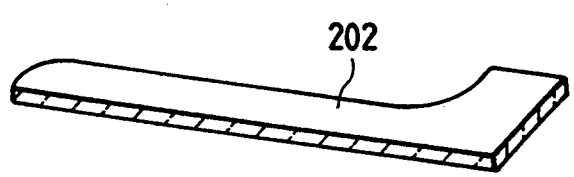

FIG. 7 is a perspective view of the glass plate 20 which illustrates that it is cut into two glass plate pieces. Specifically, the cut glass 20 shown in FIG. 7(a) is cut into two glass plate pieces 201 and 202 as shown in FIG. 7(b) and FIG. 7(c).

While each cutting operation is performed, the elastic members 22 and 25 are forcibly squeezed by the thread-shaped projections 24 and 28, causing the tensile powers each effective in the opposite direction to be applied to the cut groove 21, whereby the glass plate 20 is cut into two glass plate pieces 201 and 202 along the cut groove 21.

Each of the thread-shaped projections 24 and 28 secured to the jigs 23 and 27 is made of a soft steel wire having a diameter of 2 mm, and each of the elastic members 22 and 25 is made of a sheet of foamed polyurethane having a thickness of 0.1 mm.

It has been confirmed that a time of 10 seconds is required for achieving each cutting operation inclusive of a time required for executing a position aligning step. This means that the cutting time required by the cutting apparatus of the present invention is remarkably shortened compared with the conventional cutting apparatus.

In addition, it has been confirmed that a cutting accuracy of the cutting apparatus measured on the opposite sides of the cut groove 21 lies within the range of ±0.1 mm relative to the dimension of the cut groove 21.

Figure 8:
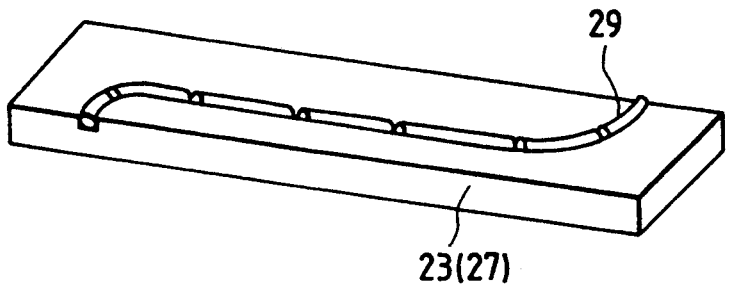
FIG. 8 is a perspective view of a jig having a plurality of partial thread-shaped projections secured thereto.

FIG. 8 is a perspective view of a jig, particularly showing another example of a thread-shaped projection to be secured to the jig. In each of the aforementioned embodiments, each thread-shaped projection is designed in the form of an continuous extension. However, the present invention should not be limited only to this continuous extension. Alternatively, the projection maybe designed in the form of an assembly of a plurality of partial thread-shaped projections (seven partial thread-shaped projections in the shown case).

Especially, in case that a plate-shaped brittle material is cut into two plate pieces with an intricate pattern, a thread-shaped projection can easily be formed at an inexpensive cost by successively preparing a plurality of partial thread-shaped projections corresponding to partial patterns constituting the intricate pattern and then combining the partial thread-shaped projections with each other.

In each of the aforementioned embodiments, a linear part and curved parts in a pattern representing a cut groove formed in a plate-shaped brittle material are simultaneously cut by operating the press machine. In case that each of the linear part and the curves parts is complicated in shape or in case that a plate-shaped brittle material is cut into two plate pieces with some difficulty, it is recommendable that the linear part and the curved parts are separately cut by repeatedly performing a cutting operation several times, in order to assure that the plate-shaped brittle material is reliably cut into two plate pieces at a high accuracy. Particularly, it is advantageously employable to form a pattern for the cut groove by combining a plurality of partial thread-shaped projections with each other in the aforementioned manner.

In addition, in each of the aforementioned embodiments, since each cutting operation is achieved by applying to a plate-shaped brittle material the tensile powers induced by the pressing power generated in the vertical direction by operating the press machine, it is possible to cut a plate-shaped brittle material into two plate pieces even in case that it is prepared in the form of a laminated material. Especially, in case of the laminated material, it is recommendable that cut grooves are formed in the laminated material from the opposite surface sides of the latter in order to assure that it is cut into two plate pieces at a high accuracy with a small magnitude of pressing power.

Next, an apparatus for cutting a plate-shaped brittle material into two plate pieces according to a fifth embodiment of the present invention will be described below with reference to FIG. 9.

Figure 9:
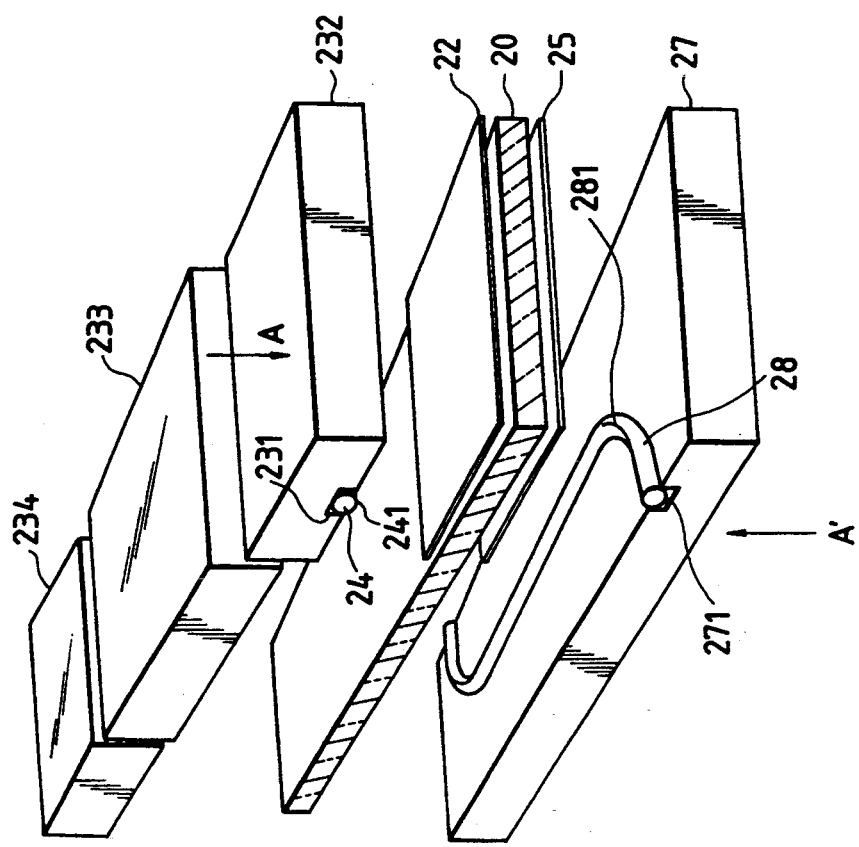
FIG. 9 is a perspective view of an apparatus for cutting a plate-shaped brittle material into two plate pieces according to a fifth embodiment of the present invention, particularly showing that an upper jig is divided into a plurality of segments corresponding to the contour of a pattern along which a cut groove is formed in the plate-shaped brittle material.

FIG. 9 is a perspective view of the cutting apparatus, particularly illustrating that a jig corresponding to the jig 23 shown in FIG. 5 is divided into a plurality of segments in conformity with a curved cutting line for a glass plate. Same components as those shown in FIG. 5 are represented by same reference numerals.

As shown in FIG. 9, the cutting line for the glass plate 20 is composed of a first curved part, a linear part and a second curved part. In case that the jig 23 is prepared in an integral structure, there arises a malfunction that both the curved parts are adversely affected by crack lines growing from the linear part during each cutting operation, resulting in warpage readily appearing along both the curved parts after completion of the cutting operation. To obviate the foregoing malfunction, the jig 23 is divided into three jig segments 232, 233 and 234 corresponding to both the first and second curved parts and the linear part with the result that appearance of "warpage" along both the first and second curved parts can be reduced. It is considered that this is attributable to the fact that growth of crack lines from both the first and second curved parts is once interrupted before the crack lines reach both the first and second curved parts. In this embodiment, the several pressing steps may be executed, in which the side segments 232 and 234, which are located at both sides of the center segment 233, are previusly pressed, and then the center segment 233 is pressed.

However, in this embodiment, a single pressing step may be executed for an assembly comprising a glass plate 20, an upper elastic member 22, an upper jig 23, a lower elastic member 25 and a lower jig 27 by operating the press machine.

Next, a method and an apparatus forming a cut groove in a plate-shaped brittle material according to the present invention will be described below with reference to FIG. 10 to FIG. 17.

Figure 10A:
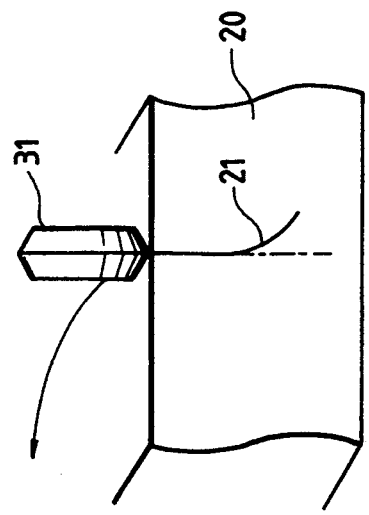
FIG. 10(a) is a fragmentary perspective view of a plate-shaped brittle material in,which a cut groove is formed by a rotary disc type scribing tip.
Figure 10B:
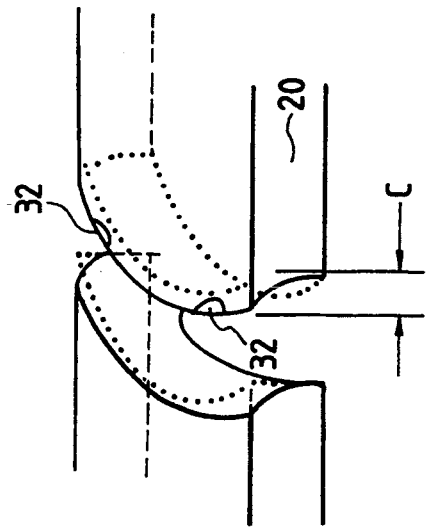
FIG. 10(b) is a fragmentary perspective view of a plate-shaped brittle material which is cut into two plate pieces with some warpage along the cut edge.

FIG. 10(a) is a fragmentary perspective view of a glass plate to be cut into two plate pieces, particularly illustrating the relationship between the direction of displacement of a rotary disc type scribing tip (represented by an arrow mark B) and the direction of bending a scribed crack in case that a scribing operation is performed using a conventional rotary disc type scribing tip 31 for forming a curved cut groove while applying a pressing power to the glass plate. In FIG. 10(a), reference numeral 20 designates a glass plate to be cut into two plate pieces. As is apparent from the drawing, a scribing crack occurs along a curved part and it is bent outside of a curved part in the rightward direction when it grows in excess of a predetermined depth. When the glass plate 20 is cut into two plate pieces while the foregoing state is maintained, the cut edge is slantwise warped with an incorrect cut surface, i.e., so-called "warpage" as shown in FIG. 10(b) is recognized. Specifically, on completion of the cutting operation, a large quantity of concave warpage C can visually be recognized. FIG. 10(b) shows a condition of the glass plate after breaking and reversing the glass plate 20 shown in FIG. 10(a), in which breakage of a part of the glass plate 20, i.e., so-called tipping designated by reference numeral 32 is occurred.

As the rotary type scribing tip 31 is rotated about a rotational shaft while coming in contact with the glass plate 20, a scribing crack is formed in the glass plate 20 along a cutting line. It is considered that the appearance of concave warpage as shown in FIG. 10(b) is attributable to the fact that a stress effective for bending the scribing crack outside of the curved part is applied to the glass plate 20 along the cutting line, since the contact point of the scribing tip 31 with the glass plate 20 is forcibly dislocated by the rotational shaft of the scribing tip 31 serving as a driving shaft of the same while a displacement shaft of the scribing tip 31 traceably moves along the cutting line on the glass plate 20.

Next, an apparatus for forming a cut groove in a plate-shaped brittle material according to a sixth embodiment of the present invention will be described below with reference to FIG. 11 to FIG. 17.

Figure 11:
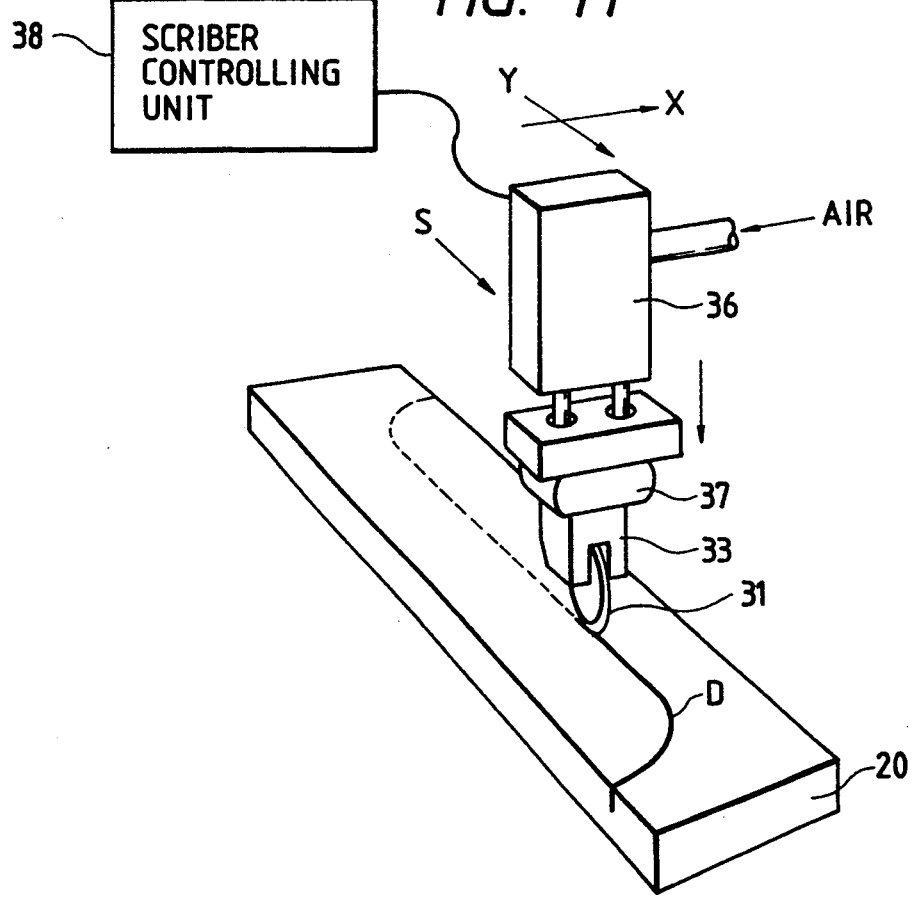
FIG. 11 is a perspective view of an apparatus for forming a cut groove in a plate-shaped brittle material according to a sixth embodiment of the present invention, particularly showing essential components constituting the apparatus.

Referring to FIG. 11, the apparatus for forming a crack C in the glass plate 20, i.e., a scriber S is composed of a scriber housing 36 adapted to move along a X-Y plane, an upper tip holder 37 displaceably held by a pneumatic cylinder (not shown) incorporated in the housing 36 so as to adequately adjust the position of the upper tip holder 37 in the Z-coordinate direction, i.e., in the vertical direction and a lower tip holder 33 for holding a rotary disc type scribing tip 31.

Figure 12A:
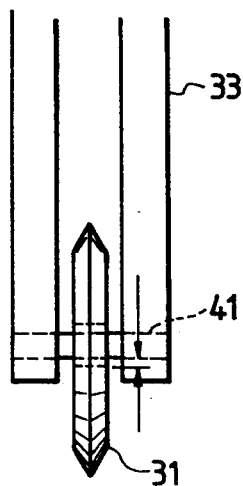
FIG. 12(a) and FIG. 12(b) show by way of example a rotary disc type scribing tip.
Figure 12B:
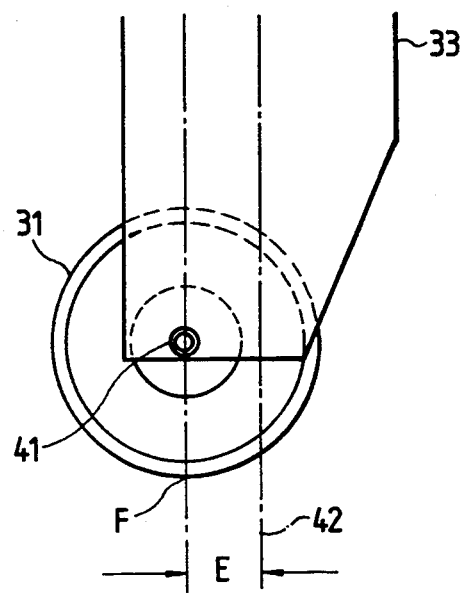

As shown in FIG. 12(a) and FIG. 12(b), the scribing tip 31 is rotatably held by the lower tip holder 33 to freely rotate about a rotational shaft 41. In addition, the lower tip holder 33 is operatively connected to the upper tip holder 37 via a driving shaft 42 so that it is turnably supported by the upper tip holder 37 to turn about the driving shaft 42. As shown in FIG. 12(b), the center axis of the rotational shaft 41 is positionally offset from the center axis of the driving shaft 42 by a quantity represented by reference character E in the drawing to define an offset range E, whereby the scriber S is constructed in a so-called caster type. With this construction, as the upper tip holder 37 traceably moves along a cutting line D (see FIG. 11), the lower tip holder 33 and the scribing tip 31 receive a driving power from the front side, causing the scribing tip 31 to be followably driven by the upper tip holder 37, whereby a stress effective in the direction of bending a crack caused on the upper surface of the glass plate 20 by the scribing tip 31 can substantially be reduced.

Figure 13:
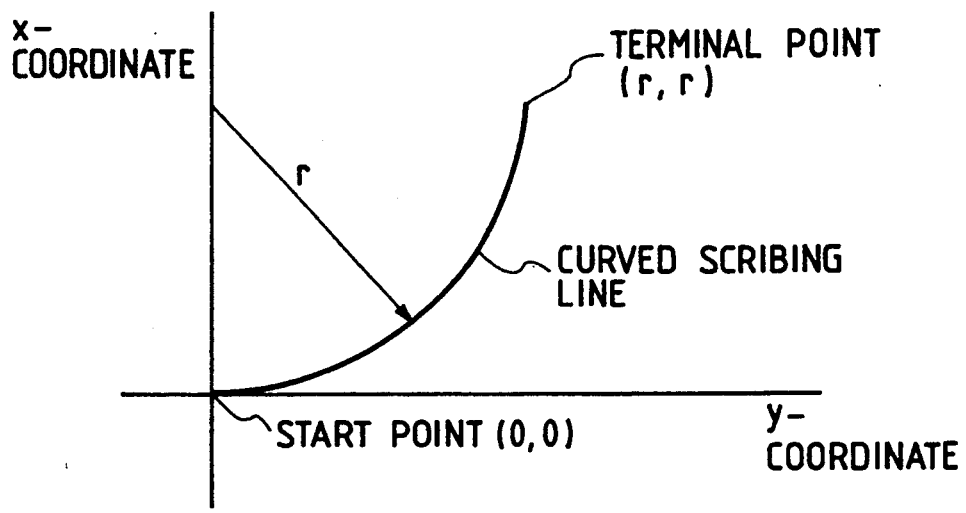
FIG. 13 is a diagram which shows the case that a rotary disc type scribing tip moves along an arc having a radius r.
Figure 14:
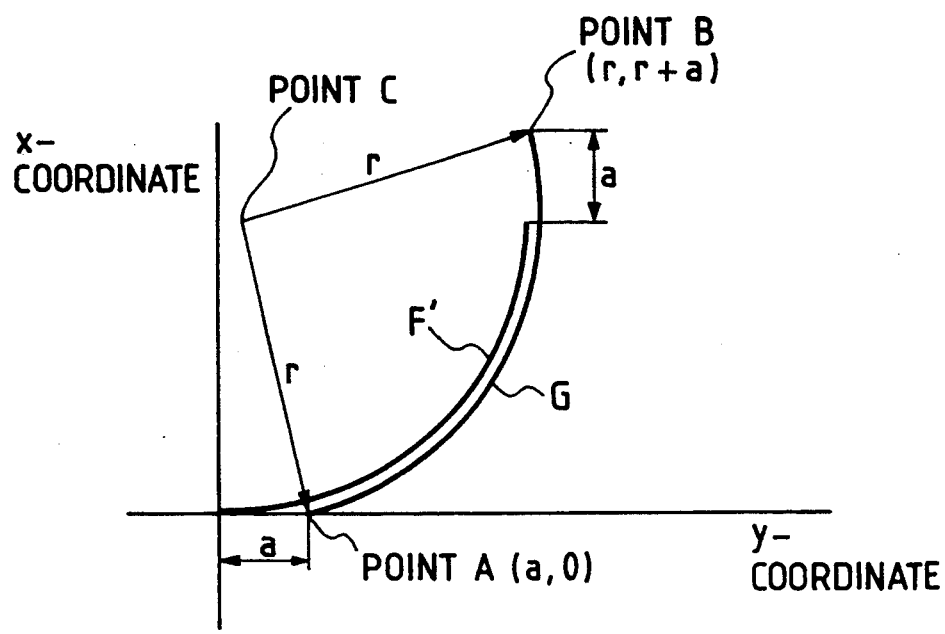
FIG. 14 is a diagram which shows the case that the rotary disc type scribing tip moves along a locus F inside of a target curved line G.

As mentioned above, the scribing tip 31 is positionally offset from the driving shaft 42 of the upper tip holder 37 by the distance E. Thus, as the driving shaft 42 of the upper tip holder 37 is displaced along a curved line G along which the glass plate 20 is to be cut into two plate pieces, the position F of the scribing tip 31 moves along a locus located inside of the curved line G as shown in FIG. 14 on the assumption that a scribing line is represented by part of a curved line, i.e., an arc having a radius r as shown in FIG. 13. Thus, it is necessary that the displacement of the holder shaft 42 is properly controlled such that the tip position F traceably moves along the curved line G. To assure that the displacement of the holder shaft 42 is automatically controlled, it is recommendable that a driving unit for the scriber S is electrically connected to a scriber controlling unit 38 constructed in the form of an automatic numerical controller (see FIG. 11). In this case, on the assumption that a radius of the curved line G is represented by r and a distance between the center axis of the driving shaft 42 for the upper tip holder 37 and the center axis of the rotational shaft for the scriber tip 31 is represented by a, the displacement of the driving shaft 42 for the upper tip holder 37 is properly controlled in the following manner so as to allow the position of the scriber tip 31 to traceably move along the curved line G.

1. The rotational shaft 41 of the scriber tip 31 is displaced to the position coincident with the X-coordinate located away from an original point on a tangential line extending from a start point of the curved line G by a distance a as seen in the forward direction. The foregoing position coincident with the start point of the curved line G is represented by A.

2. A position on a tangential line extending from the curved line G located away from a terminal position of the curved line G by a distance a in the forward direction is determined. The foregoing position is represented by B.

3. A position located away from both the position A and B toward a center of the curved line G is determined. The foregoing position is represented by C.

4. The driving shaft 42 for the upper tip holder 37 is displaced on the assumption that the position A is taken as a start point, the position B is taken as a terminal point and the position C is taken as a center.

Thus, the displacement of the driving shaft 42 for the upper tip holder 37 is controlled by programming the scriber controlling unit 38 in conformity with the aforementioned conditions. In case that the locus of displacement of the scriber tip 31 does not lie within a target positional accuracy for some reason, a quantity of deviation of the present locus from the target one is measured by actuating a microscope or a similar device, and thereafter, fine adjustment is made among the positions A, B and C so as to allow the present curved line to coincide with a desired one as far as possible.

As shown in FIG. 15(a) to FIG. 15(c), to execute a scribing step, a projection member 41 is interposed between a table 51 of a press machine (not shown) and a glass plate 20 while extending along a scribing line G.

In case that the projection member 41 is located directly below the scribing tip 31 as shown in FIG. 15(b), a certain intensity of moment can be applied to the glass member 20 on the opposite sides of the scribing line G with the projection member 41 as a center. In this case, linearity of a scribing crack in the direction of a thickness of the glass plate 20 can be improved by applying the moment to the glass plate 20.

Usually, the projection member 41 is made of a hard material. Alternatively, the projection member 41 may be made of a sheet or film of elastic material such as a polyurethane resin or the like. In case that the scribing line G is a linear line, the projection member 41 is located directly below the scribing line G as shown in FIG. 15(b). On the contrary, in case that the scribing line G is a curved line, the projection member 41 is placed on the press table at the position offset inside of the scribing line G as shown in FIG. 15(a). In this case, linearity of the scribing crack in the direction of a thickness of the glass member 20 can be improved substantially. In contrast with the case shown in FIG. 15(a), when the projection member 41 is placed on the press table at the position as shown in FIG. 15(c), there is recognized a tendency that linearity of the scribing crack is degraded.

To apply a certain intensity of moment to the glass plate 20, a pair of press rollers 39 are arranged on the opposite sides of the scribing line as shown in FIG. 16 in such a manner as to scribe a scribing line on the glass plate 20 by rolling the scribing tip 31 in parallel with the press rollers 39. Alternatively, moment may be applied to the glass plate 20 by evacuating a fluid (air in the practice case) through a plurality of fluid suction holes 52 arranged on the opposite sides of the projection member 41 as shown in FIG. 17 so as to allow the fluid to flow therethrough from the table 51 side in the direction represented by reference numeral 53. Otherwise, moment may be applied to the glass plate 20 by fixedly mounting suitable jigs on the opposite sides of the glass plate 20 to thrust the opposite ends of the glass plate 20 toward the press table 51 in the downward direction.

Next, a mode of practical operation of the cut groove forming apparatus constructed in the aforementioned manner will be described below.

A projection member 41 having a sectional contour similar to that of a glass plate 20 to be cut into two plate pieces by operating the cut groove forming apparatus as shown in FIG. 11 was placed on the table 51 of a press machine (not shown) at a predetermined position where a scribing line was to be scribed in conformity with a predetermined pattern. Subsequently, the glass plate 20 was placed on the projection member 41, and thereafter, a scribing operation was performed while controlling the scriber S with the aid of the automatic numerical controlling unit 38 in such a manner as to allow the locus of displacement of the scribing tip 31 to coincide with the locus of the cutting line D. At this time, an intensity of tip pressing power was set to 2 Kg.

During each scribing operation, a pair of press rollers 39 were thrusted against the opposite sides of the glass plate 20 in the downward direction while the scribing tip 31 was located between both the press rollers 39 which were rolling on the glass plate 20. Thus, the press rollers 39 were always displaced in parallel with the displacement of the scribing tip 31. The glass plate 20 to be cut into two plate pieces was a borosilicate glass having a thickness of 1.1 mm, the scribing tip 31 having a tip angle of 135 degrees was made of a material having very high hardness such as cemented tungsten carbide or the like, the press rollers 39 each having a radius of 1 mm at the tip end thereof were made of an acrylic resin, a distance between the scribing tip 31 and each press roller 39 was set to 3 mm, and a speed of each scribing operation was set to 2 mm/second. Moment to be applied to the glass plate 20 was generated by the pressing power given by the press rollers 39 placed on the opposite sides of the glass plate 20 while the projection member 41 was placed on the table 41 at the position directly below the scribing line D. Since a certain intensity of tensile power was applied to the glass plate 20 in the opposite direction at a right angle relative to the scribing line D at the same time when a crack appeared in the glass plate 20, the linear crack having a large depth was formed in the glass plate 20. In contrast with the conventional cut groove forming apparatus wherein no moment is applied to the glass plate 20 while a pressing power to be applied to the opposite sides of the glass plate 20 by the press rollers 39 is set to 2 Kg and a crack has a depth of about 0.6 mm, the cut groove forming apparatus of the present invention assures that a crack can linearly be penetrated through the glass plate 20 under the condition that moment is applied to the glass plate 20 with the tip pressing power set to 2 Kg and the roller pressing power set to 1 Kg for each press roller 39.

In addition, a scribing operation was performed by evacuating the table 51 through the fluid suction holes 52 under the same conditions as mentioned above with the exception that the press rollers 39 were removed from the cut groove forming apparatus. In this case, since the glass plate 20 was firmly placed on the projection member 41 while it was pressed merely by the scribing tip 31, moment was not uniformly be applied to the glass plate 20 on the opposite sides of the latter in the downward direction across the whole length of the scribing line D. For this reason, some warpage was recognized along the crack after completion of the scribing operation. In contrast with the case that no moment is applied to the glass plate 20 with a depth of crack of 0.6 mm, the cut groove forming apparatus having moment applied to the glass plate 20 made it possible to form a crack having a depth ranging from 0.8 to 1.1 mm. In view of the fact that the cut groove forming apparatus has such properties that each crack grows toward the projection member 41 placed on the table 51, it has been confirmed that a quantity of warpage on the crack can be reduced from a level of 0.3 mm down to a level of 0.1 mm by initially offsetting the position of the projection member 41 in the opposite direction to that of bending of the crack.

With the cutting apparatus constructed according to the present invention, first, a cut groove having a desired pattern is formed in a plate-shaped brittle material to be cut into two plate pieces by actuating a cutting tool made of diamond, hard metal (cemented carbide) or the like.

Subsequently, a thread-shaped projection having a ridge line extending in conformity with the cut groove to be formed in the plate-shape brittle material is brought in contact with the surface of the plate-shaped brittle material to be cut into two plate pieces in conformity with the cut groove while the elastic member is interposed between the jig and the plate-shaped brittle material, whereby the plate-shaped brittle material is cut into two plate pieces in conformity with a predetermined pattern positionally coincident with the cut groove.

While a cutting operation is performed with the cutting apparatus, the thread-shaped projection on the jig is usually brought in contact with the surface of the plate-shaped brittle material on the cut groove side of the latter. Alternatively, the thread-shaped projection may be brought in contact with the surface of the plate-shaped brittle material on the opposite side relative to the cut groove side of the plate-shaped brittle material. Otherwise, the plate-shaped projection may be brought not only in contact with the surface of the plate-shaped brittle material on the cut groove side of the latter but also in contact with the surface of the plate-shaped brittle material on the opposite side relative to the cut groove side of the plate-shaped brittle material.

To practice a method of cutting a plate-shaped brittle material into two plate pieces with the aid of the cutting apparatus constructed according to the present invention, a jig having a thread-shaped projection secured thereto of which ridge line extends in conformity with the cut groove to be formed in the plate-shaped brittle material is arranged on one side of the plate-shaped brittle material. Alternatively, two jigs each designated in the same manner as the foregoing jig may be arranged on the opposite sides of the plate-shaped brittle material. A predetermined intensity of pressing power is applied to the jig from above by operating a press machine so that the plate-shaped brittle material is cut into two plate pieces in conformity with the predetermined pattern positionally coninicident with the cut groove.

The elastic member interposed between the jig and the plate-shaped brittle material is pressed and squeezed by the thread-shaped projection on the jig, causing the plate-shaped brittle material to be elongated in the opposite directions relative to the cut groove during the cutting operation. The pressing force applied to the jig is converted into tensile powers each effective in the opposite direction with the cut groove as a center, causing the crack caused in association with the cut groove to be widened until the plate-shaped brritle material is cut into two plate pieces.

In the circumstances as mentioned above, a material exhibiting excellent compressibility and expansibility without any possibility that it is cut into pieces when it is pressed and squeezed by the pressing power applied thereto should be selected as a material employable for the elastic member. To assure that the tensile power of the elastic member is effectively applied to the plate-shaped brittle material in the elongating direction, it is desirable that friction appearing between the elastic member and the plate-shaped brittle material exhibits a high frictional coefficient.

It is necessary that the thread-shaped projection secured to the jig has a sectional contour which assures that the elastic member is adequately pressed and squeezed by the pressing power via the thread-shaped projection. The thread-shaped projection has a ridge line which extends across the jig so as to enable the pressing power applied to the plate-shaped brittle material at a right angle relative to the surface of the latter to be converted into tensile powers each oriented in the opposite direction with the cut groove as a center while the ridge line is brought in line contact with the plate-shaped brittle material via the elastic member.

To this end, it is recommendable that a synthetic resin exhibiting excellent elastic restorability against the pressing power such as a polyurethane resin or the like is employed as a material for the elastic member. Although a silicone resin, a polyethylene resin or the like may be substituted for the polyurethane resin, there is a possibility that the elastic member itself is cut into pieces during a cutting operation, and moreover, it is hardly elongated in the direction at a right angle relative to the pressing power applied to the surface of the jig, resulting in a higher intensity of pressing power being unavoidably required for achieving the cutting operation for the plate-shaped brittle material. For this reason, the polyurethane resin is employable as a most suitable material for the elastic member.

Any specific definition is not made with repect to a thichness of the elastic member but it is recommendable that the thickness of the elastic member is set to the range of 0.05 to 0.4 mm in order to assure that each cutting operation can satisfactorily be achieved with the cutting apparatus.

The thread-shaped projection secured to the jig may be designated to have any sectional contour, provided that it can exhibit a working effect for pressing and squeezing the elastic member with the pressing power and then allowing it to be elongated at t right angle relative to the pressing power. To assure that the elastic member is elongated at a high efficiency, it is recommendable that the sectional contour of the thread-shaped projection has radious of about 1 mm.

Any kind of material may be employed for the thread-shaped projection, provided that it can sufficiently stand against the pressing power applied to the thread-shaped projection via the jig. In addition, to assure that the thread-shaped projection exhibits the same effect as that of the elastic member, a material having a low elastic modulus may be employed for the thread-shaped projection. Alternatively, the outer surface of the thread-shaped projection made of a hard material may be coated with a film of elastic material. In this case, any elastic member is not required for constituting the cutting apparatus. With this construction, since the thread-shaped projection is brought directly in contact with the plate-shaped brittle material to be cut into two plate pieces, the thread-shaped projection coated with a film of elastic material is not suitably employable in case that a series of cutting operations are repeatedly performed with the cutting apparatus.

While the present invention has been described above with several preferred embodiments thereof, it should of course be understood that the present invention should not be limited only to these embodiments but various change or modification may be made without departure from the scope of the present invention as defined by the appended claims.

What is claimed is:

1. A method of cutting a plate-shaped brittle material into two plate pieces comprising the steps of:

forming a cut groove in said plate-shaped material in conformity with a predetermined pattern extending on said plate-shaped brittle material in the longitudinal direction of the latter;

superimposing a jig having a thread-shaped projection secured thereto on said plate-shaped brittle material on the cut groove side of the latter with an elastic member interposed between said plate-shaped brittle material and said jig while a ridge line of said thread-shaped projection extends in conformity with said predetermined pattern of said cut groove with a constant height as measured from the surface of said plate-shaped brittle material; and applying a predetermined intensity of compressing force to said plate-shaped brittle material at a right angle relative to the surface side of said plate-shaped brittle material having said cut groove formed therein via said jig and said elastic member to compress said jig with the thus applied compressing force, whereby two plate pieces each cut from said plate-shaped brittle material in conformity with said predetermined pattern are obtained by operating an apparatus for cutting a plate-shaped brittle material into two plate pieces.

2. The method according to claim 1 further including the step of:

superimposing another jig having a thread-shaped projection secured thereto on said plate-shaped brittle material on the opposite side relative to the cut groove side of said plate-shaped brittle material with an elastic member interposed between said plate-shaped brittle material and said jig while a ridge line of said thread-shaped projection extends in conformity with said predetermined pattern of said cut groove with a constant height as measured from the surface of said plate-shaped brittle material, said superimposing step being executed prior to said compressing power applying step.

3. The method according to claim 2, wherein said thread-shaped projection secured to said jig is formed by allowing said thread-shaped projection to continuously extend in conformity with said predetermined pattern positionally coincident with said cut groove.

4. The method according to claim 1, wherein said thread-shaped projection secured to said jig is formed by allowing said thread-shaped projection to continuously extend in conformity with said predetermined pattern positionally coincident with said cut groove.

5. The method according to claim 1, wherein said thread-shaped projection secured to said jig is formed by allowing said thread-shaped projection to intermittently extend in conformity with said predetermined pattern positionally coincident with said cut groove.

6. The method according to claim 1, wherein an elastic modulus of said elastic member is set to be smaller than that of said plate-shaped brittle material to be cut into two plate pieces.

7. A method of cutting a plate-shaped brittle material into two plate pieces comprising the steps of:

forming a cut groove in said plate-shaped brittle material in conformity with a predetermined pattern extending on said plate-shaped brittle material in the longitudinal direction of the latter;

superimposing a pair of jigs each having a thread-shaped projection secured thereto on said plate-shaped brittle material on the cut groove side of the latter as well as on the opposite side relative to the cut groove side with elastic members interposed between said plate-shaped brittle material and said jigs while a ridge line of each of said thread-shaped projections extends in conformity with said predetermined pattern of said cut groove with a constant height as measured from the surface of said plate-shaped brittle material; and applying a predetermined intensity of compressing power to said plate-shaped brittle material at a right angle relative to the cut groove side of said plate-shaped brittle material via the upper jig and the upper elastic member to compress said plate-shaped brittle material with the thus applied compressing force, whereby two plate pieces each cut out from said plate-shaped brittle material in conformity with said predetermined pattern are obtained by operating an apparatus for cutting a plate-shaped brittle material into two plate pieces.

8. The method according to claim 7, wherein said thread-shaped projection secured to said jig is formed by allowing said thread-shaped projection to intermittently extend in conformity with said predetermined pattern positionally coincident with said cut groove.

9. The method according to claim 7, wherein an elastic modulus of said elastic member is set to be smaller than that of said plate-shaped brittle material to be cut into two plate pieces.

* * * * *